(12) United States Patent
Menezo et al.

(10) Patent No.: US 10,209,442 B2
(45) Date of Patent: Feb. 19, 2019

(54) PHOTONIC CHIP WITH REFLECTING STRUCTURE FOR FOLDED OPTICAL PATH

(71) Applicant: COMMISSARIAT A L'ENERGIE ATOMIQUE ET AUX ENERGIES ALTERNATIVES, Paris (FR)

(72) Inventors: Sylvie Menezo, Voiron (FR); Stéphane Bernabe, Moirans (FR); Philippe Grosse, Sassenage (FR)

(73) Assignee: COMMISARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/978,418

(22) Filed: May 14, 2018

(65) Prior Publication Data

US 2018/0335566 A1 Nov. 22, 2018

(30) Foreign Application Priority Data

May 17, 2017 (FR) .................. 17 54362

(51) Int. Cl.
*G02B 6/12* (2006.01)
*G02B 6/34* (2006.01)
*G02B 6/42* (2006.01)

(52) U.S. Cl.
CPC .......... *G02B 6/12002* (2013.01); *G02B 6/34* (2013.01); *G02B 6/4214* (2013.01)

(58) Field of Classification Search
CPC ....... H01L 2924/00014; H01L 2924/00; H01L 2224/73204; G02B 6/12; G02B 6/4214; G02B 6/34
See application file for complete search history.

(56) References Cited

U.S. PATENT DOCUMENTS

| | | | |
|---|---|---|---|
| 7,742,674 B2 * | 6/2010 | Mossberg | G02B 5/203 385/129 |
| 8,503,839 B2 * | 8/2013 | Cheben | G02F 1/365 385/129 |

(Continued)

FOREIGN PATENT DOCUMENTS

EP 3002568 A1 4/2016

OTHER PUBLICATIONS

Streibl, N. et al: "Parallel optoelectronic interconnections with high packing density through a light-guiding plate using grating couplers and field lenses", Optics Communications, Elsevier, Amsterdam, NL, vol. 99, No. 3-4, Jun. 1, 1993, pp. 167-171.

(Continued)

*Primary Examiner* — Jennifer Doan
(74) *Attorney, Agent, or Firm* — Pearne & Gordon LLP

(57) ABSTRACT

Optical coupling of a photonic chip to an external device by use of a system with two lenses. The photonic chip comprises a light guide layer supported by a substrate and covered by an encapsulation layer, and a lens integrated into either the front face or the back face. The light guide layer includes a wave guide coupled to a surface grating coupler. An arrangement of one or several reflecting structures each on either the front face or the back face, is provided. This arrangement comprises a reflecting structure on the back face and is made so as to assure propagation of light between the surface grating coupler, and the lens along an optical path having at least one fold. The invention also covers the fabrication method of such a photonic chip.

11 Claims, 16 Drawing Sheets

(56) References Cited

U.S. PATENT DOCUMENTS

| | | |
|---|---|---|
| 2002/0003824 A1 | 1/2002 | Lo et al. |
| 2013/0209026 A1 | 8/2013 | Doany et al. |
| 2016/0266322 A1 | 9/2016 | Epitaux et al. |
| 2016/0299292 A1 | 10/2016 | Hassan et al. |

OTHER PUBLICATIONS

S. Bernabé et al: "On-Board Silicon Photonics-Based Transceivers With 1-Tb/s Capacity" IEEE Transactions on Components, Packaging and Manufacturing Technology, vol. 6, No. 7, Jul. 2016, pp. 1018-1025.

U.S. Appl. No. 15/873,465; entitled "Photonic device comprising a laser optically connected to a silicon wave guide and method of fabricating such a photonic device", filed Jan. 17, 2018.

* cited by examiner

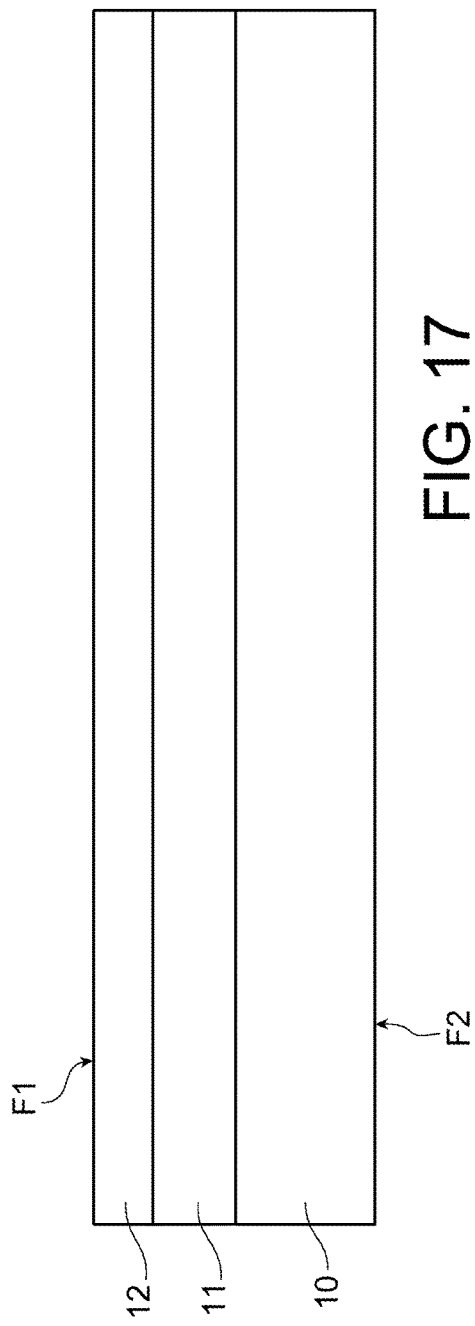
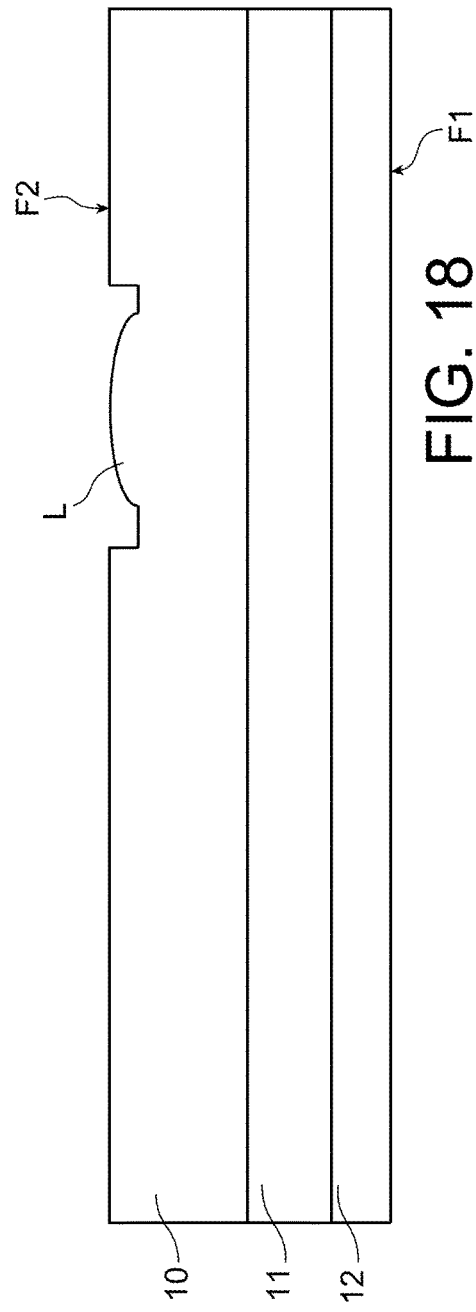

PHOTONIC CHIP WITH REFLECTING STRUCTURE FOR FOLDED OPTICAL PATH

CROSS-REFERENCE TO RELATED APPLICATIONS

This application claims priority from French Patent Application No. 17 54362 filed on May 17, 2017. The content of this application is incorporated herein by reference in its entirety.

DESCRIPTION

Technical Domain

The domain of the invention is photonic integrated chips. The invention relates more particularly to optical coupling of a photonic chip with an external device, for example with another photonic chip, an optical fibre or a set of optical fibres.

State of Prior Art

Photonic chips comprising a "Photonic Integrated Circuit" are generally fabricated on SOI ("Silicon On Insulator") substrates for the silicon photonic technology, or InP (indium phosphide) or GaAs (gallium arsenide) substrates for the III-V photonic technology.

Since the photonic circuit generally communicates with the external world, it must be possible to inject light from an external device such as an optical fibre into the circuit and vice-versa. The most frequently used component in silicon photonics for this coupling of light between the fibre and the circuit is the surface grating coupler, that can firstly adapt the size of the optical mode propagating in the guides of the circuit to the size of the mode propagating in standard single-mode fibres, and secondly can change from guided propagation in the plane of the photonic chip to propagation in free space almost vertical to the plane of the chip.

With the silicon technology, this component can thus couple light from a wave guide in the plane of the photonic chip to a cleaved single mode fibre at an angle from the vertical, frequently about 8°. Its mode size Do is designed to be similar to the single fibre mode size, and its diameter is therefore about 9.2 µm, which corresponds to optimised coupling of light between the silicon waveguide of the photonic chip and the cleaved single mode fibre. Its losses are 1 to 4 dB optical when the geometric alignment between the surface grating coupler and the single-mode fibre is optimal. The grating-fibre alignment tolerance, characterised as the radial misalignment between the optical alignment that generates 1 dB of additional losses, is about +/−2 µm.

In order to increase this alignment tolerance to make alignment operations less complex and particularly so that they can be made using less expensive passive alignment techniques, the paper by S. Bernabé et al., "On-Board Silicon Photonics-Based Transceivers With 1-Tb/s Capacity", in IEEE Transactions on Components, Packaging and Manufacturing Technology, vol. 6, No. 7, July 2016, discloses the use of a system with two lenses composed of a first lens fixed to the photonic chip and a second lens fixed to the optical fibre. This system can make use of a lens connector into which the optical fibre is inserted, consequently positioning it relative to the second lens. The first lens must be very precisely aligned with the photonic chip, and then fixed to it. The alignment tolerance between the chip+first lens assembly and the second lens+fibre assembly is then increased to +/−40 µm.

FIG. 1 shows a diagrammatic sectional view of the photonic chip and the first lens L added onto and fixed onto one face of the chip. The photonic chip comprises a light guide layer 12 with a thickness of T12 (for example 300 nm) supported by a silicon substrate 10 with thickness T10 (for example 750 µm) and covered by an encapsulation layer 13 with thickness T13 (for example 3 µm). The photonic chip has a front face F1 on the side of the encapsulation layer 13 and a back face F2 on the side of the substrate 10.

The light guide layer carries photonic components (wave guide, surface grating coupler, PN modulator, etc.), the fabrication of which may for example comprise etching of a silicon on insulator layer. In such a case, the light guide layer 12 is separated from the substrate 10 by a Buried Oxide Layer (BOX) with thickness T11 (for example 800 nm).

The light guide layer 12 includes a waveguide 121 coupled to a surface grating coupler 122 configured to receive light from the waveguide and to form a light beam from the waveguide directed towards the front face F1 of the photonic chip (or vice versa). The waveguide 121 and the surface grating coupler 122 are shown herein in a longitudinal section in which light propagates in these components in the plane of the figure, along the Y direction when light is to be extracted from the photonic chip.

The light guide layer 12 can also include active components such as a modulator 123 composed of a waveguide with a PN junction, in this case shown in a cross-section, light propagating in this component perpendicular to the plane of the figure.

The encapsulation layer 13 generally comprises metal electrical interconnection levels of the photonic chip. This layer is known as the "Back End Of Line" (BEOL) in fabrication methods used in microelectronics. Its thickness T13 is a few microns (for example 3 µm), and it is composed of dielectric materials and etched metal lines. An electronic chip PE designed to control or read active photonic components of the photonic chip (modulators, photo-detectors) is generally transferred onto the photonic chip. On FIG. 1, the chip PE is thus electrically connected to the modulator 123 in the light guide layer, for example by means of copper micro-pillars 33. The interstice between the electronic chip PE and the photonic chip needs to be filled with a filling layer 34 made of a polymer material, so as to mechanically hold the chip PE in place with the photonic chip.

The lens L is positioned on the front face F1 of the photonic chip, facing the surface grating coupler 122, to modify the mode size of light passing through it from or to the surface grating coupler. For example, this lens may be fixed to the photonic chip by means of copper micro-pillars 33, the interstice between the lens L and the photonic chip being filled in by the same filling layer 34 made of a polymer material. With this type of solidarisation method, the filling layer 34 is on the optical path of the light beam between the surface grating coupler 122 and the lens L. Insertion of this layer of polymer material generates additional light losses.

In order to widen and collimate a light source with wavelength $\lambda$ and mode size Do=2*wo at the output from the surface grating coupler, the focal length in air of the lens L must be equal to Fair=Di. ($\pi$. wo/2$\lambda$), where Di is the size of the widened beam at the output from the first lens. In order to obtain a widened collimated beam with a diameter Di of about 100 µm, and assuming an output angle from the surface grating coupler relative to the vertical equal to 0° for simplification reasons, the convex lens made of silica glass with an index of 1.45 at a wavelength of 1.31 μm, must have the following characteristics:
- thickness TL equal to about 860 μm, corresponding to a focal length in air, Fair, equal to about 600 μm;
- radius of curvature about 270 μm;
- diameter about 10 μm,
- sagitta depth SAG about 6 μm.

The alignment tolerance of lens L with the photonic chip is +/−2 μm. The lens L must be very precisely aligned with the photonic chip, before being fixed to it.

PRESENTATION OF THE INVENTION

The purpose of the invention is to eliminate the complex and expensive operation to align the lens with the photonic chip in a system with two lenses for coupling the photonic chip to an external device.

To achieve this, it discloses a photonic chip comprising a light guide layer supported by a substrate and covered with an encapsulation layer. The photonic chip has a front face on the side of the encapsulation layer and a back face on the side of the substrate. The light guide layer includes a waveguide coupled to a surface grating coupler configured to receive light from the waveguide and to form a light beam directed towards either the front face or the back face. The photonic chip also comprises an integrated lens at either the front face or the back face and configured to modify the mode size of light passing through it from or to the surface grating coupler. The photonic chip also comprises an arrangement of one or several reflecting structures each on either the front face or the back face. Said arrangement comprises a reflecting structure on the back face and is made so as to assure propagation of light between the surface grating coupler and the lens along an optical path having at least one fold.

Some preferred but non-limitative aspects of this chip are as follows:
- a reflecting structure of said arrangement is a metallic layer arranged on either the front face or the back face;
- a reflecting structure of said arrangement is a distributed Bragg grating formed on either the front face or the back face;
- the lens is integrated on the front face, the surface grating coupler is configured to redirect the light beam towards the back face and said arrangement comprises along the optical path a single reflecting structure on the back face;
- the lens is integrated on the front face, the surface grating coupler is configured to redirect the light beam towards the front face and said arrangement comprises along the optical path a first reflecting structure on the front face and a second reflecting structure on the back face,
- the lens is integrated on the back face, the surface grating coupler is configured to redirect the light beam towards the back face and said arrangement comprises along the optical path a first reflecting structure on the back face and a second reflecting structure on the front face;
- the lens is integrated on the back face, the surface grating coupler is configured to redirect the light beam towards the front face and said arrangement comprises along the optical path a first reflecting structure on the front face, a second reflecting structure on the back face and a third reflecting structure on the front face;
- the encapsulation layer is a silicon oxide layer, a silicon nitride layer or a layer composed of a mix of silicon oxide and silicon nitride;
- the light guide layer is supported on an insulation layer and an anti-reflection layer is interposed between the substrate and the insulation layer;
- the substrate is made of glass.

The invention also relates to a method of fabricating such a photonic chip, said method comprising the formation of an arrangement of one or several reflecting structures, each on either the front face or the back face of the chip, said arrangement comprising a reflecting structure on the back face and being formed so as to propagate light between the surface grating coupler and the lens along an optical path having at least one fold.

BRIEF DESCRIPTION OF THE DRAWINGS

Other aspects, purposes, advantages and characteristics of the invention will be better understood after reading the detailed description given below of preferred embodiments of the invention, given as non-limitative examples, with reference to the appended drawings on which:

FIGS. 17-20 illustrate an example manufacturing embodiment of a photonic chip with the lens integrated on the back face.

DETAILED PRESENTATION OF PARTICULAR EMBODIMENTS

Figure 1:
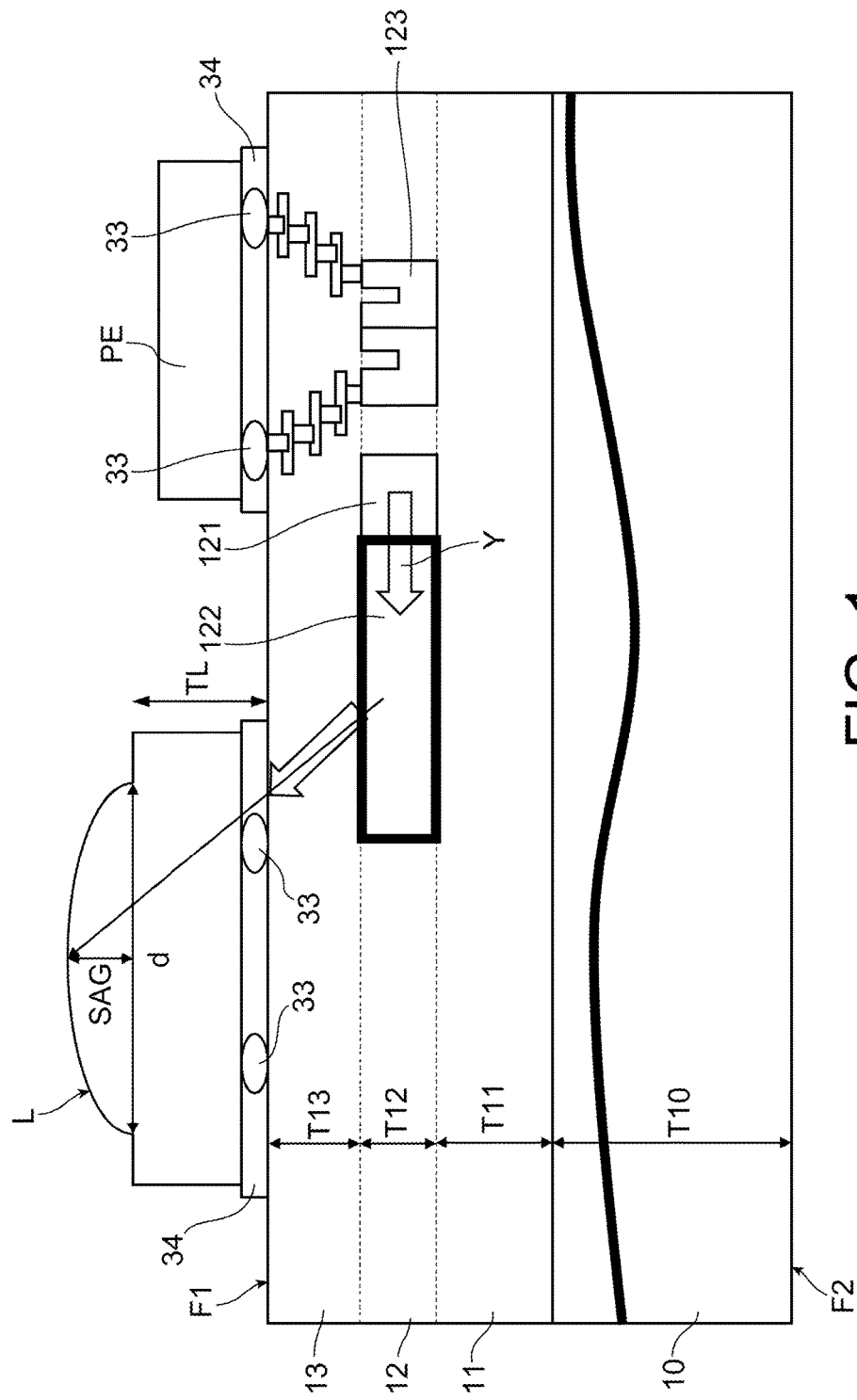
FIG. 1, already discussed above, is a diagrammatic sectional view of a photonic chip on which a lens is added.

The invention relates to optical coupling of a photonic chip with an external device using a mode size widening system, typically a system with two lenses, capable of increasing the alignment tolerance between the photonic chip and the external device. The photonic chip according to the invention is similar to that presented above with reference to FIG. 1. However, the lens is not added onto and fixed on the front face but is directly integrated into either the front face or the back face. Identical elements on the different figures have the same references.

Figure 2:
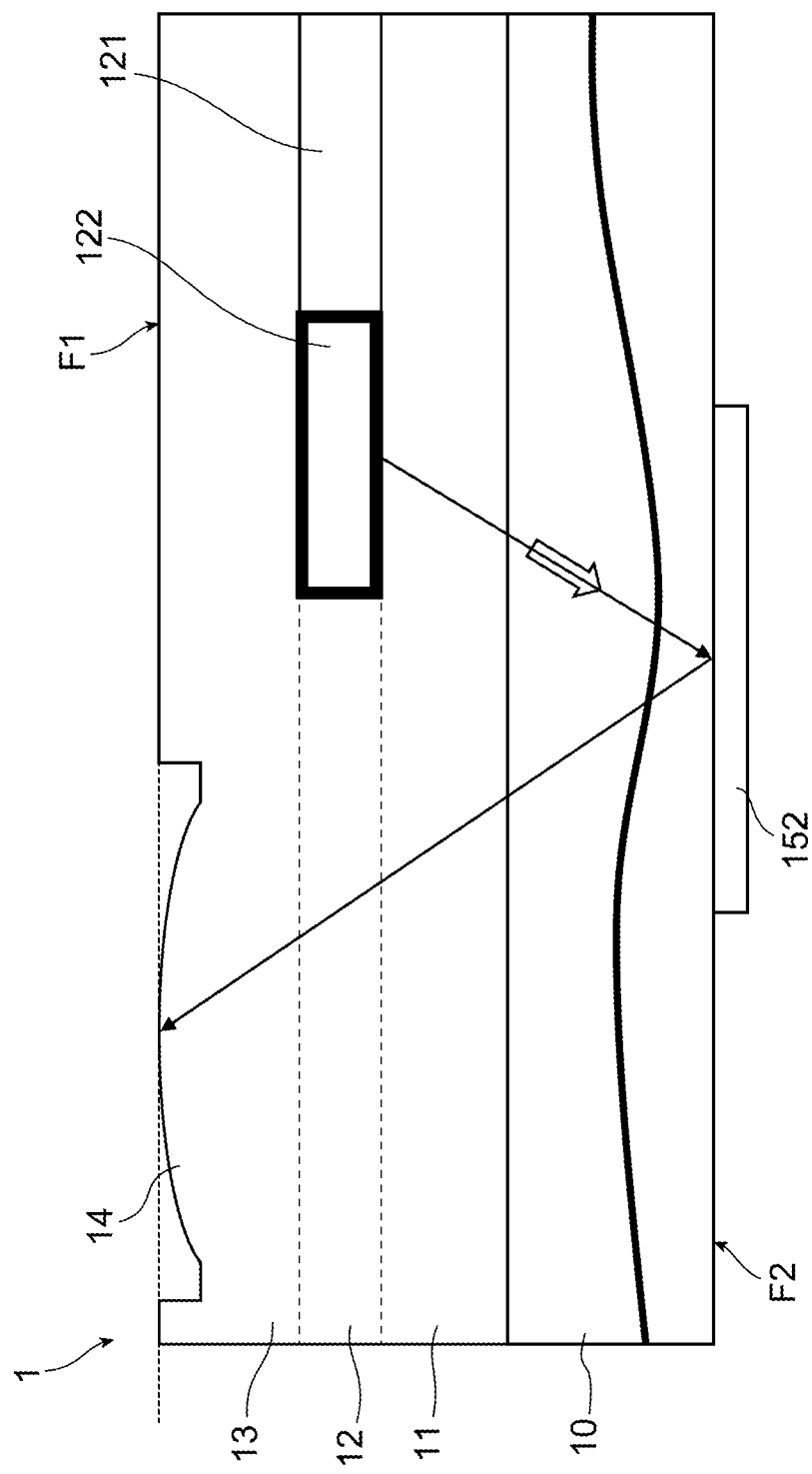
FIG. 2 is a diagrammatic view of a photonic chip according to the invention with a surface grating coupler directing light towards the back face and an integrated lens on the front face.
Figure 3:
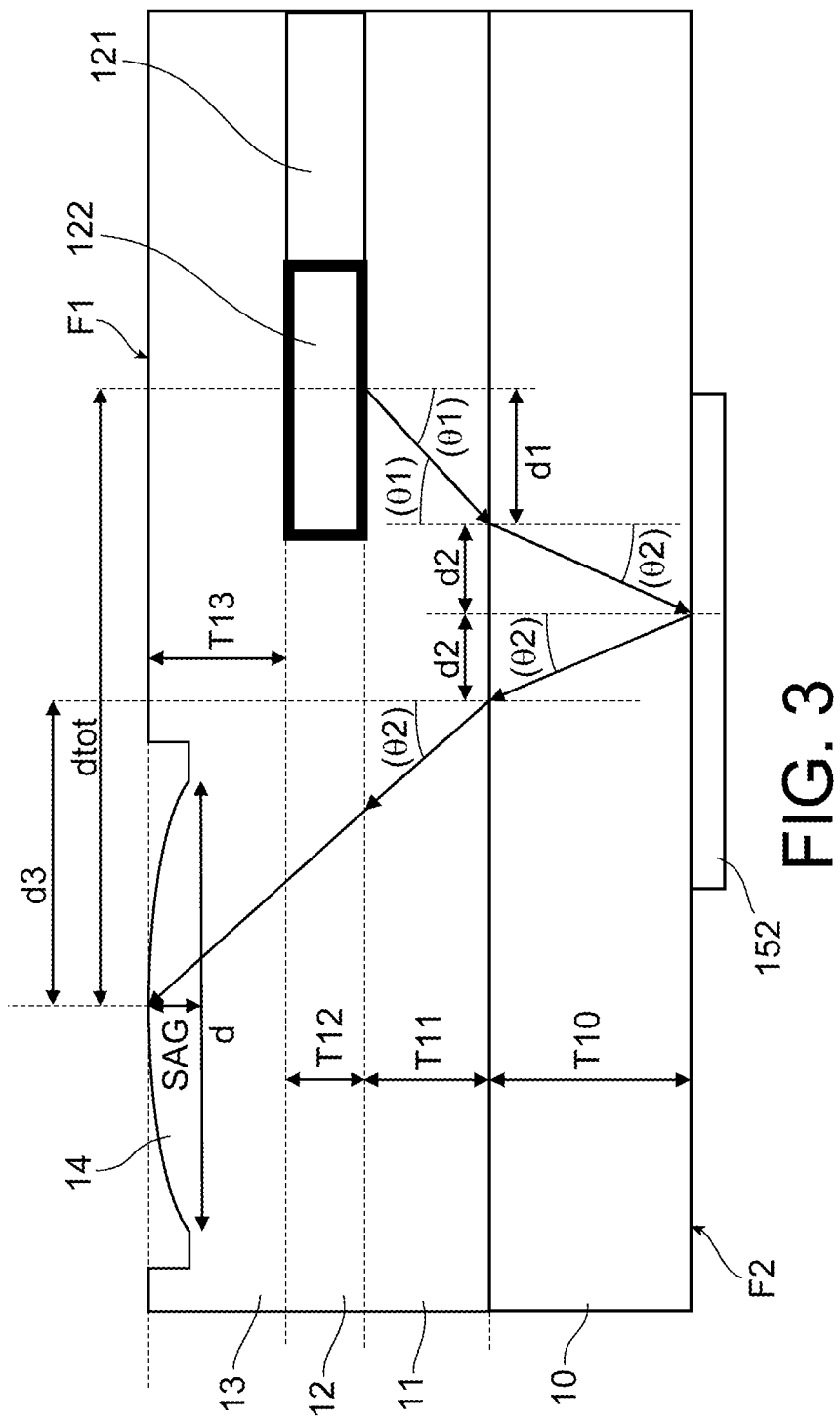
FIG. 3 is a sectional view similar to the view in FIG. 2, illustrating one possible design of a photonic chip according to the invention.
Figure 4:
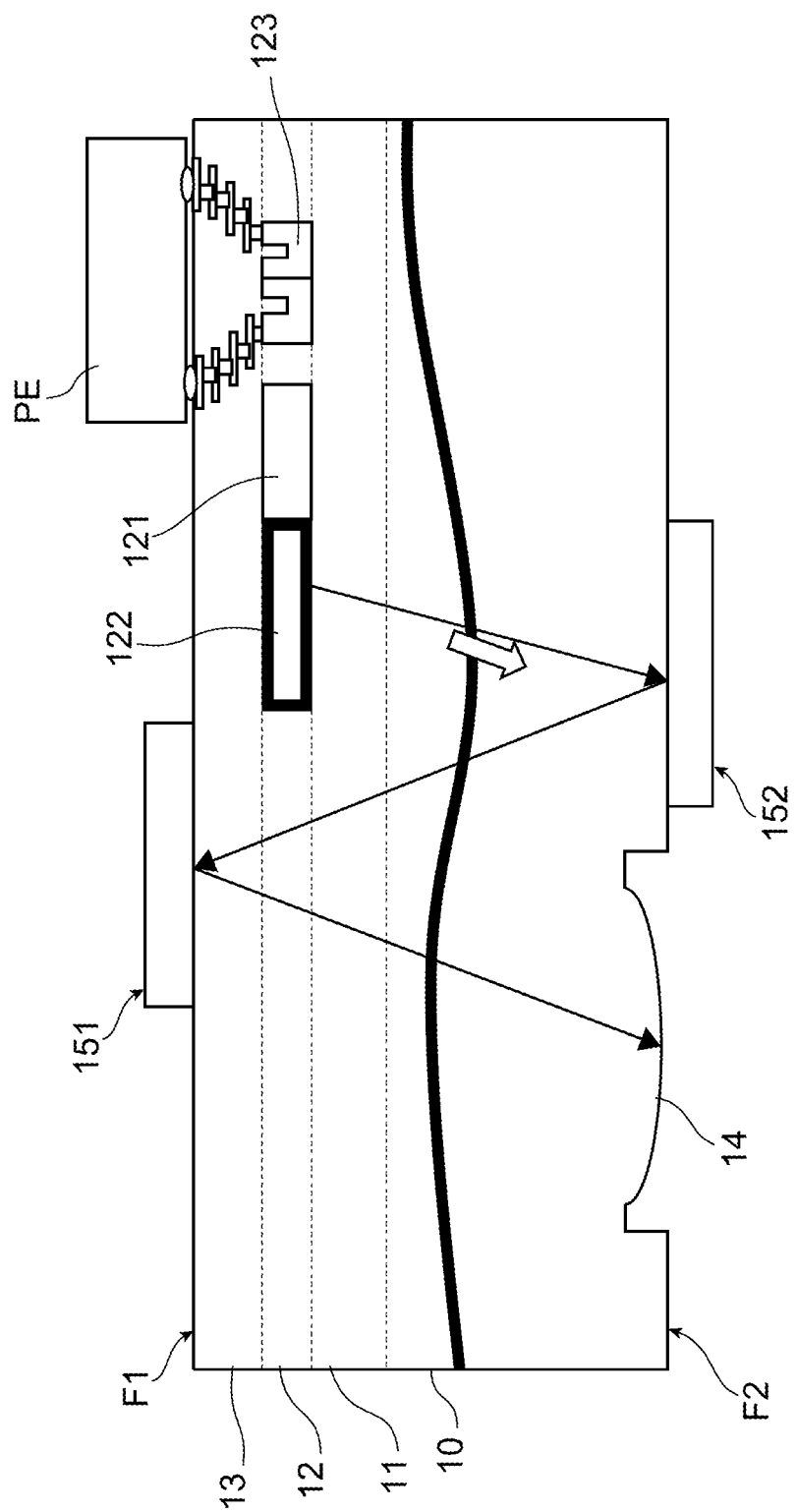
FIG. 4 is a diagrammatic sectional view of a photonic chip according to the invention with a surface grating coupler directing light towards the back face and an integrated lens on the back face.
Figure 6:
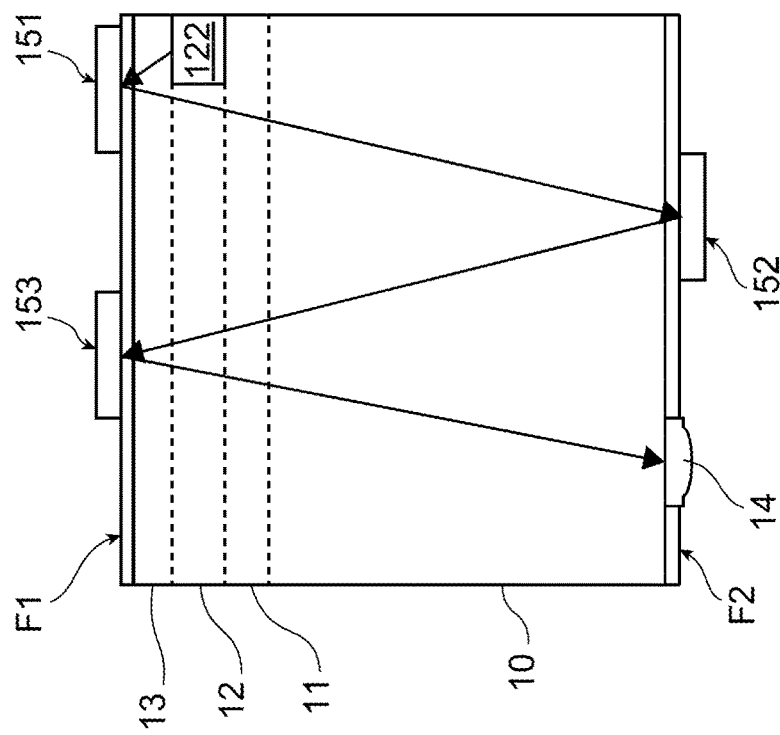
FIG. 6 is a diagrammatic sectional view of a photonic chip according to the invention with a surface grating coupler directing light towards the front face and an integrated lens on the back face.
Figure 5:
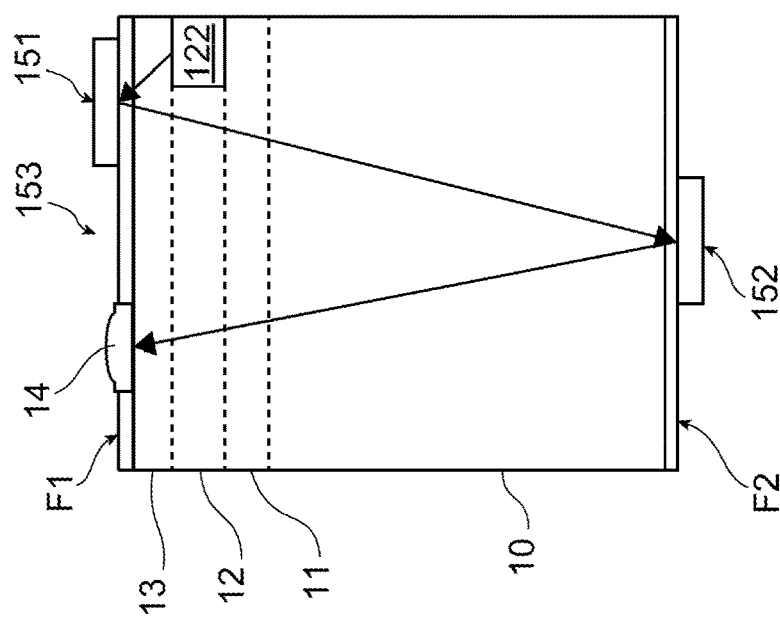
FIG. 5 is a diagrammatic sectional view of a photonic chip according to the invention with a surface grating coupler directing light towards the front face and an integrated lens on the front face.

FIGS. 2, 3 and 5 give an example of a photonic chip according to the invention with a lens integrated on the front face, while FIGS. 4 and 6 give an example of a photonic chip according to the invention with a lens integrated on the back face. With reference to these figures, the invention relates to a photonic chip 1 comprising a light guide layer 12 supported by a substrate 10 and covered with an encapsulation layer 13. A buried oxide layer 11 may be intercalated between the light guide layer 12 and the substrate 10. The encapsulation layer 13 may be a silicon oxide layer, a silicon nitride layer, or a layer composed of a mix of silicon oxide and silicon nitride. It will be noted that the SAG value can be reduced by making the lens in a silicon nitride layer with an index n=2 greater than the index n=1.45 of SiO2, or in a layer composed of a mix of silicon oxide and silicon nitride.

The substrate 10 may be a substrate made of silicon, indium phosphide or gallium arsenide. In one possible embodiment, the substrate 10 is a glass substrate that has the advantage of limiting optical losses at the interface between the buried oxide layer 11 and the substrate 10.

The photonic chip 1 has a front face F1 on the side of the encapsulation layer 13 and a back face F2 on the side of the substrate 10. The light guide layer comprises a waveguide 121 coupled to a surface grating coupler configured to receive light from the waveguide and to form a light beam from this light, directed towards either the front face or the back face. The surface grating coupler thus changes from propagation guided in the plane of the chip to quasi-vertical propagation, for example forming an angle of about 8° with the vertical to the plane of the chip.

The photonic chip also comprises a lens 14 integrated into either the front face or the back face and configured to modify the mode size of light passing through it from or to the surface grating coupler. The photonic chip with an integrated lens will be optically coupled to another device arranged facing the chip, for example an optical circuit, an electro-optical circuit, a photonic chip, one or several optical fibres, this device comprising at least one optical input and/or output fixed to a lens performing the function inverse to the lens 14 integrated into the photonic chip. The lens 14 is in the form of a spherical dioptre for which the cap is formed on either the front face or the back face, typically by etching.

By integrating the lens into the photonic chip, the invention can eliminate the need for the expensive steps of fine alignment and of lens-to-chip solidarisation. Lens integrated into the photonic chip means particularly the fact that the lens is fabricated at the wafer, and more particularly the fact that fabrication of the lens is perfectly integrated into a standard method of fabricating the photonic chip.

We have already seen that the thickness of the lens must be about 860 μm in order to obtain a 100 μm diameter widened collimated beam using a silica glass lens. The result is that the lens cannot be integrated onto the front face F1 of the photonic chip because the optical path between the surface grating coupler 122 and the front face F1 of the chip is only a few microns of silica (its thickness is globally equal to the thickness T13 of the encapsulation layer 13, for example 3 μm).

It is also not possible to integrate the lens onto the back face F2 of the chip using a surface grating coupler 122 configured to direct the light beam received from the wave guide towards the back face, because the substrate 10 is not thick enough. In this case, the length of the optical path between the surface grating coupler 122 and the back face F2 of the chip can be assumed to be approximately equal to the thickness T10 of the substrate 10. For Si, InP or GaAs substrates, the optical index at the 1.31 μm wave length is about 3.5, and the thickness of material necessary to obtained a 100 μm diameter widened collimated beam is of the order of 2100 μm. The thickness T10 is typically equal to 750 μm +/−25 μm for a 200 mm diameter silicon substrate, 625 μm +/−25 μm for a 75 mm diameter InP substrate, and 450 μm for a 75 mm diameter GaAs substrate. Therefore the thickness of the substrate 10 is generally insufficient to be able to satisfactorily widen the beam diameter.

To overcome these difficulties in integrating the lens on the front face or back face of the photonic chip, with reference to FIGS. 2 to 6, the photonic chip also comprises an arrangement of one or several reflecting structures 151, 152, 153 each on either the front face or the back face. This arrangement is made so as to assure propagation of light between the surface grating coupler 122 and the lens 14 along an optical path having at least one fold.

More particularly, this arrangement comprises a reflecting structure on the back face. In this way, regardless of whether the lens is integrated on the front face or the back face, the optical path comprises at least one double pass through the substrate 10. By thus extending the focal length, the lens 14 makes it possible to satisfactorily widen the diameter of the optical beam.

In one embodiment, a reflecting structure of said arrangement is a metallic layer deposited on either the front face or the back face, for example, a gold, silver or aluminium layer. In one variant embodiment, a reflecting structure of said arrangement is a Distributed Bragg Reflector (DBR) composed of a stack of layers deposited on either the front face or the back face.

A reflecting structure is formed locally on either the front face or the back face of the photonic chip. Alternatively, a reflecting structure can be formed on the entire front face or back face of the photonic chip, for example on the entire back face in particular in the example in FIG. 2.

The description given below is particularly applicable to the example of light transmission from the photonic chip waveguide towards the external device (extraction of light), the lens forming an outlet port for light. However, the principles presented are identical for light transmission from the external device towards the photonic chip waveguide (injection of light), the lens forming an input port for light. Thus, the surface grating coupler 122 is not only configured to receive light from the waveguide and form a light beam from the waveguide towards the back face F2 and reflected by the reflecting structure(s) to reach and pass through the lens, but also configured to receive a light beam from the back face after passing through the lens and being reflected on the reflecting structure(s) and to transfer this beam towards the waveguide.

FIGS. 2 and 3 represent a first example integration of the lens on the front face of the photonic chip. In this example, the surface grating coupler 122 is configured to receive light from the waveguide and to form a light beam from it towards the back face F2. In this case, said arrangement of one or several reflecting structures comprises a single reflecting structure 152 on the back face F2. The output beam from the surface grating coupler 122 is reflected by this reflecting structure 152 towards the lens 14 on the front face F1.

FIG. 3 shows the angles followed by the light beam along the optical path between the surface grating coupler 122 and the lens 14. Thus, the angle $\Theta 1$ in the $SiO_2$ buried oxide layer 11 is about 8°. The angle $\Theta 2$ in the silicon substrate 10 is about 3°. The optical path, CO, of the surface grating coupler at the lens on the front face F1 is rigorously written as $CO = 2 \times T11/\cos(\Theta 1) + 2 \times T10/\cos(\Theta 2) + (T12+T13)/\cos(\Theta 1)$. This optical path can be approximated as $2 \times T10$, with an error of less than 0.5%. With a silicon substrate 10 with a thickness T10=750 μm passed through twice (in the embodiment in FIGS. 2 and 3), the equivalent focal length of the lens in air is about 430 µm, and the beam diameter at the output from the lens 1 can be widened to about 75 µm.

With reference to FIG. 3, the distance dtot separating the centre of the surface grating coupler 122 from the centre of the lens is equal to dtot=d1+2×d2+d3, namely approximately 2×d2=2×T10×tan(Θ2)=87 µm. The lens diameter is 80 µm, such that the distance between the edge of the lens and the surface grating is dtot−d/2=47 µm. The lens is made of $SiO_2$, and its sagitta SAG is about 9 µm. When made of silicon nitride SiNx, the SAG is equal to about 4.5 µm.

FIG. 4 represents a first example integration of the lens on the back face of the photonic chip. In this example, the surface grating coupler 122 is configured to receive light from the waveguide and to form a light beam from the waveguide towards the back face F2. In this case, said arrangement of one or several reflecting structures comprises a first reflecting structure 152 on the back face F2 and a second reflecting structure 151 on the front face F1. The output beam from the surface grating coupler 122 is reflected by the first reflecting structure 152 towards the second reflecting structure 151 and then from the second reflecting structure 151 towards the lens 14 on the back face. In this example, the optical path from the surface grating coupler to the lens can be approximately 3×T10. When T10=750 µm, the beam diameter at the output from the lens 1 can be widened to about 110 µm.

FIG. 5 represents a second example integration of the lens on the front face of the photonic chip. In this example, the surface grating coupler 122 is configured to receive light from the waveguide and to form a light beam from the waveguide towards the front face F1. In this case, said arrangement of one or several reflecting structures comprises a first reflecting structure 151 on the front face F1 and a second reflecting structure 152 on the back face F2. The output beam from the surface grating coupler 122 is reflected by the first reflecting structure 151 towards the second reflecting structure 152 and then from the second reflecting structure 152 towards the lens 14 on the front face. In this example, the optical path from the surface grating coupler to the lens can be approximately 2×T10.

FIG. 6 represent a second example integration of the lens on the back face of the photonic chip. In this example, the surface grating coupler 122 is configured to receive light from the waveguide and to form a light beam from the waveguide towards the front face F1. In this case, said arrangement of one or several reflecting structures comprises a first reflecting structure 151 on the front face F1, a second reflecting structure 152 on the back face F2 and a third reflecting structure 153 on the front face F1. The output beam from the surface grating coupler 122 is reflected by the first reflecting structure 151 towards the second reflecting structure 152, then from the second reflecting structure 152 towards the third reflecting structure 153, and finally from the third reflecting structure 153 towards the lens 14 on the back face. In this example, the optical path from the surface grating coupler to the lens can be approximately 3×T10.

It will be noted that integration of the lens on the back face (FIGS. 4 and 6) can be accompanied by integration of a laser on the front face, and particularly a III-V laser.

It has already been seen that the alignment tolerance of the lens added onto the photonic chip (FIG. 1) is equal to 2 µm. This tolerance is considerably increased by use of the invention. It thus increases to more than 18 µm by doubling the optical path in the substrate (FIGS. 2 and 5) and to more than 28 µm by tripling the optical path in the substrate (FIGS. 4 and 6).

In one possible embodiment, the substrate is thinned to adapt the diameter of the widened beam, for example so that it is conforming with lens connector standards.

In order to limit Fresnel losses when crossing the interface between the buried oxide layer 11 and the substrate 10 (they are 0.8 dB with an $SiO_2$ layer 11 and an Si substrate 10), an anti-reflection layer (for example a silicon nitride layer with a thickness of λ/4 where λ is equal to the wavelength of the light beam) can be arranged between the layer 11 and the substrate 10.

Instead of using SiO2 as the material for the buried oxide layer 11, it is also possible to use a silicon nitride SiNx or a mix of SiO2 and SiNx. Losses at the crossing of the interface between the layer 11 and the substrate 10 are then about 0.3 dB with a layer of silicon nitride with an effective index of about 2.

The use of a glass substrate, for example made of borosilicate glass, can eliminate optical losses at the layer 11-substrate 10 interface.

The following describes two example manufacturing embodiments of a photonic chip according to the invention and more particularly a chip according to the embodiment shown on FIG. 2. These examples are different in that in the first example, the surface grating coupler is designed to direct light downwards, while in the second example it is designed to direct light upwards.

Figure 7:
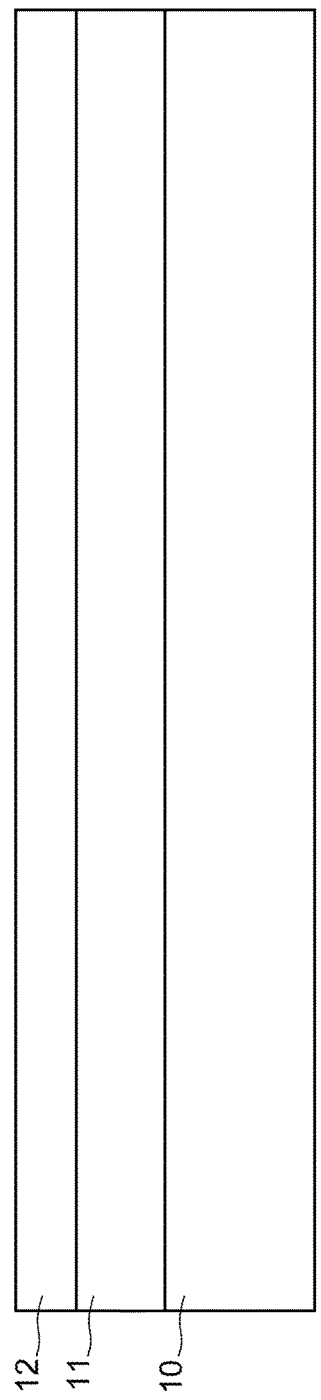
FIGS. 7-11 illustrate a first example manufacturing embodiment of the photonic chip in FIG. 2.
Figure 8:
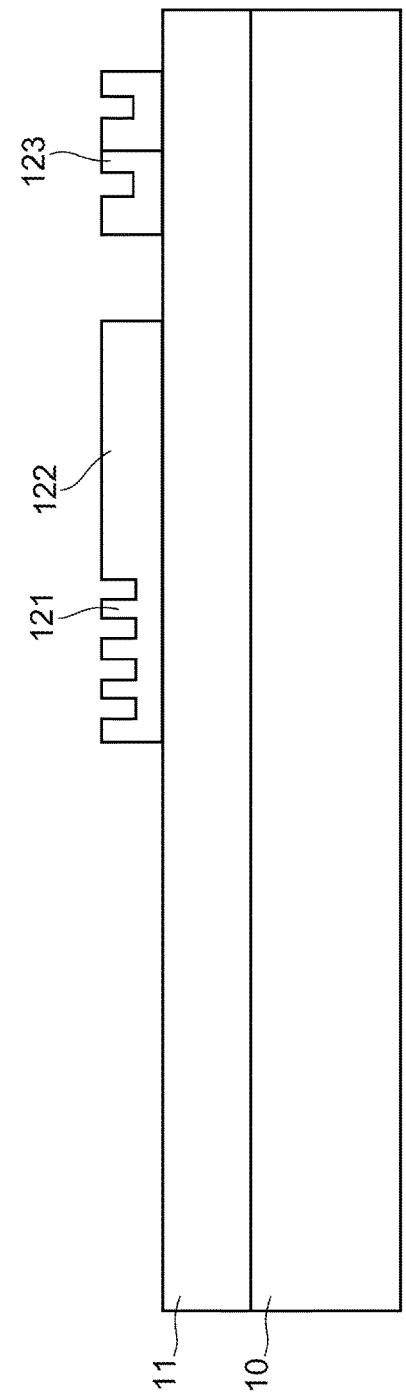

In the framework of the first embodiment, the method begins (FIG. 7) by supplying an SOI substrate with a buried oxide layer 11 intercalated between a surface silicon layer 12 and a silicon substrate 10 and by the fabrication (FIG. 8) of photonic components (waveguide 121, surface grating coupler 122, PN modulator 123, etc.) by total or partial local etching of the surface layer 12 and implantation in the case of the modulator. An anti-reflection layer (not shown) may be interposed between the buried oxide layer 11 and the substrate 10.

Figure 9:
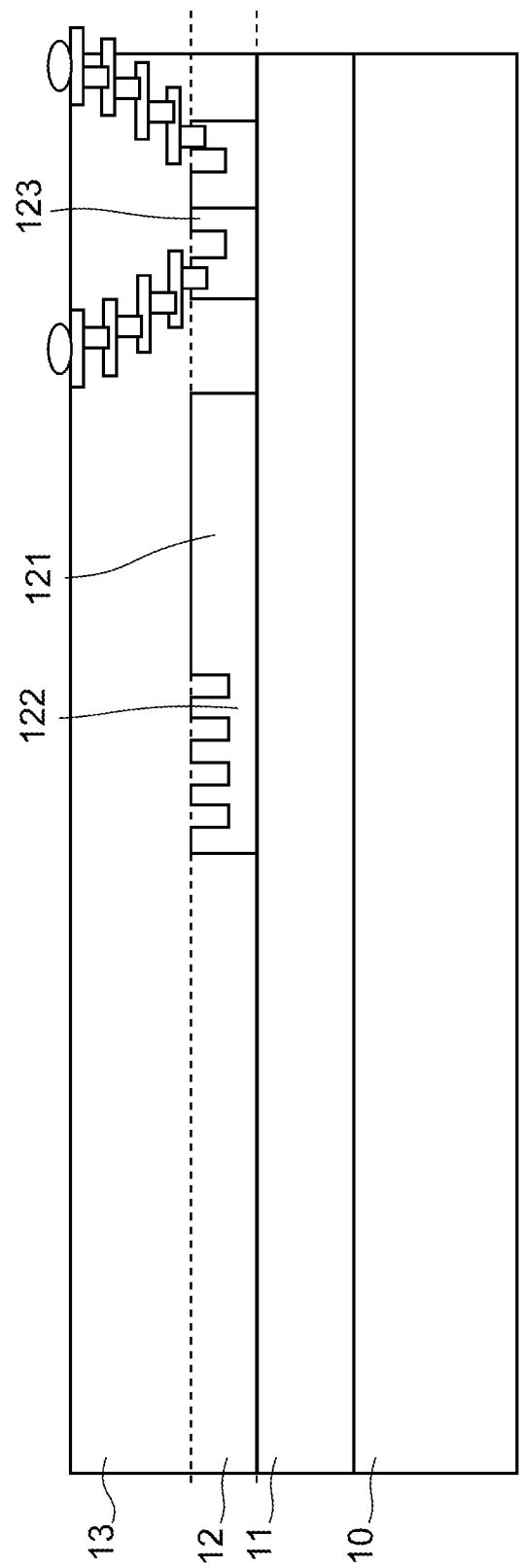
Figure 10:
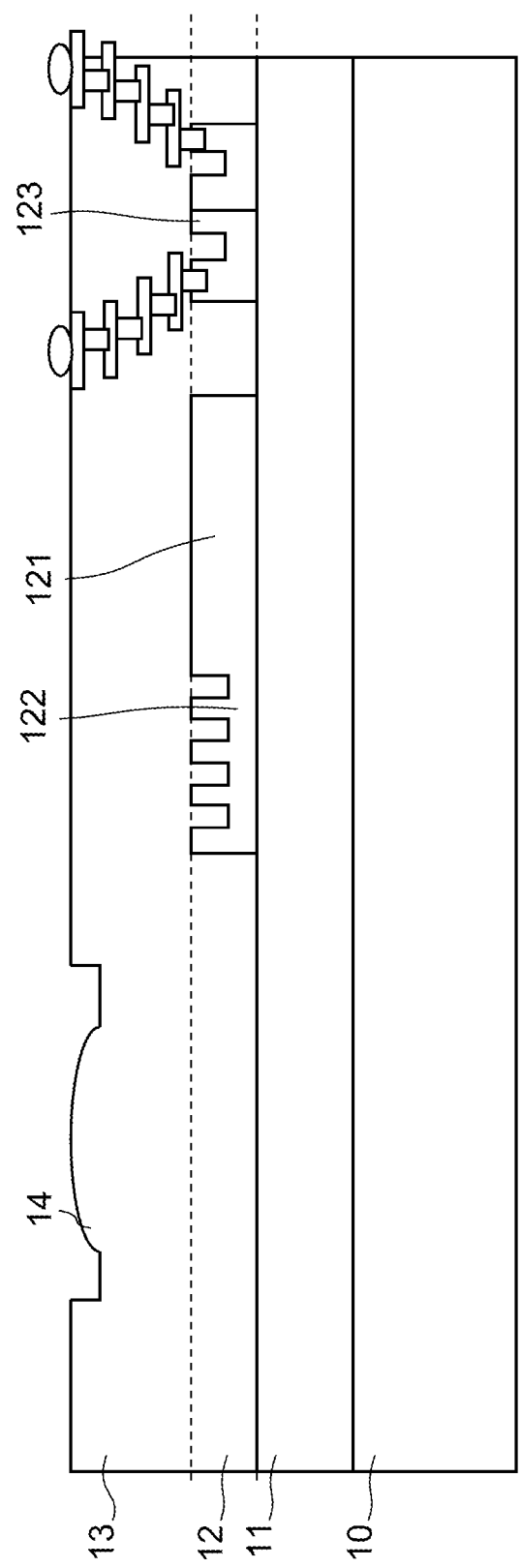
Figure 11:
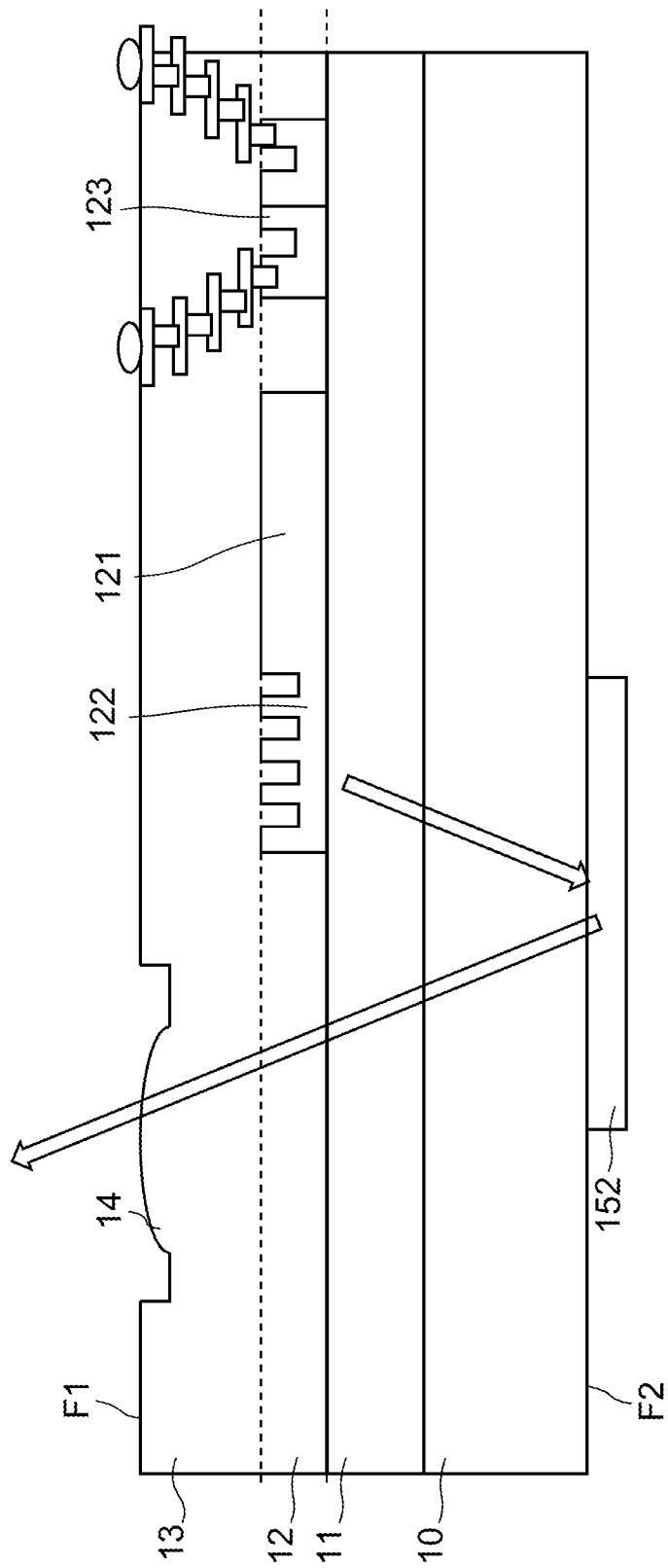

The next step (FIG. 9) is fabrication of the BEOL encapsulation layer 13. As shown, this layer may include the metal levels of electrical interconnections of the photonic chip, in this case connecting the modulator 123 to an electronic chip. The lens 14 is then fabricated in the layer 13 (FIG. 10). It can be fabricated in the dielectric material of the BEOL or in another deposited encapsulation material. This fabrication may include mechanical etching, for example laser machining, or Reactive Ion Etching (RIE) to form a spherical dioptre on the surface of layer 13. Etching may be done after insolation of a photosensitive resin through a mask to form a resin boss and creep of said boss. Once the lens 14 has been formed, an anti-reflection treatment can be made on it. The next step is formation of the reflecting structure 152 on the back face (FIG. 11), for example by deposition of a metallic layer. However, this operation may be done at any other time, for example at the beginning of the process.

Figure 12:
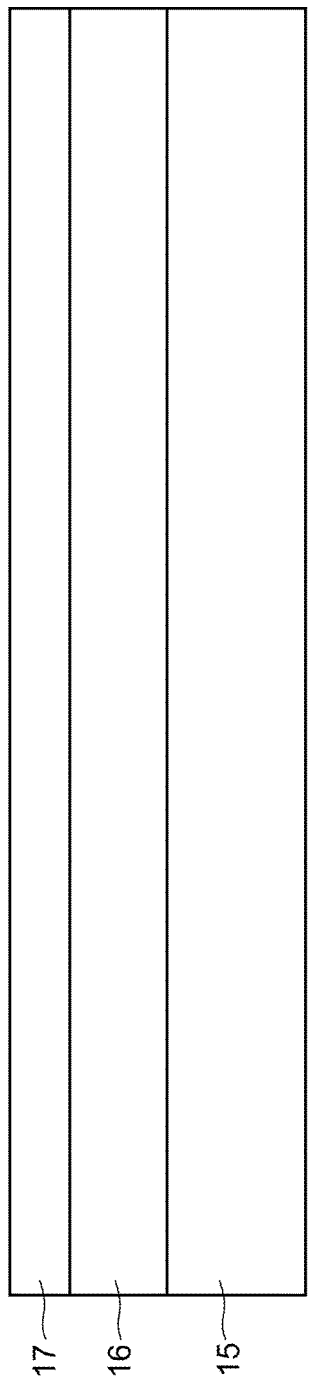
FIGS. 12-16 illustrate a second example manufacturing embodiment of the photonic chip in FIG. 2.
Figure 13:
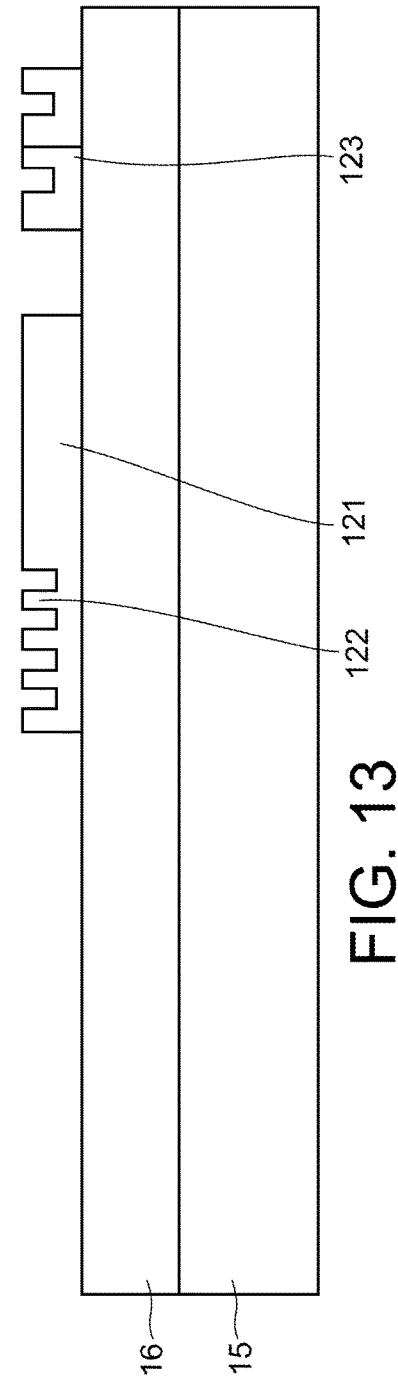

In the framework of the second embodiment, the method begins (FIG. 12) by supplying an SOI substrate with a buried oxide layer 16 intercalated between a surface silicon layer 17 and a silicon substrate 15 and by the fabrication (FIG. 13) of photonic components (waveguide 121, surface grating coupler 122, PN modulator 123, etc.) by total or partial local etching of the surface layer 17 and implantation in the case of the modulator.

Figure 14:
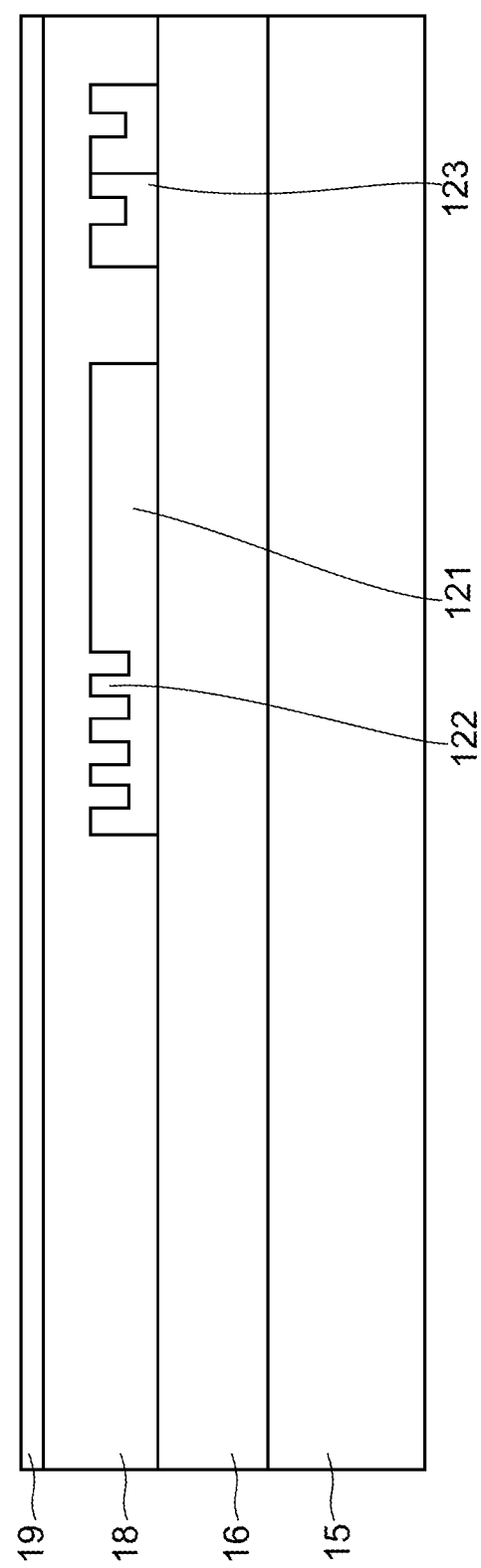
Figure 15:
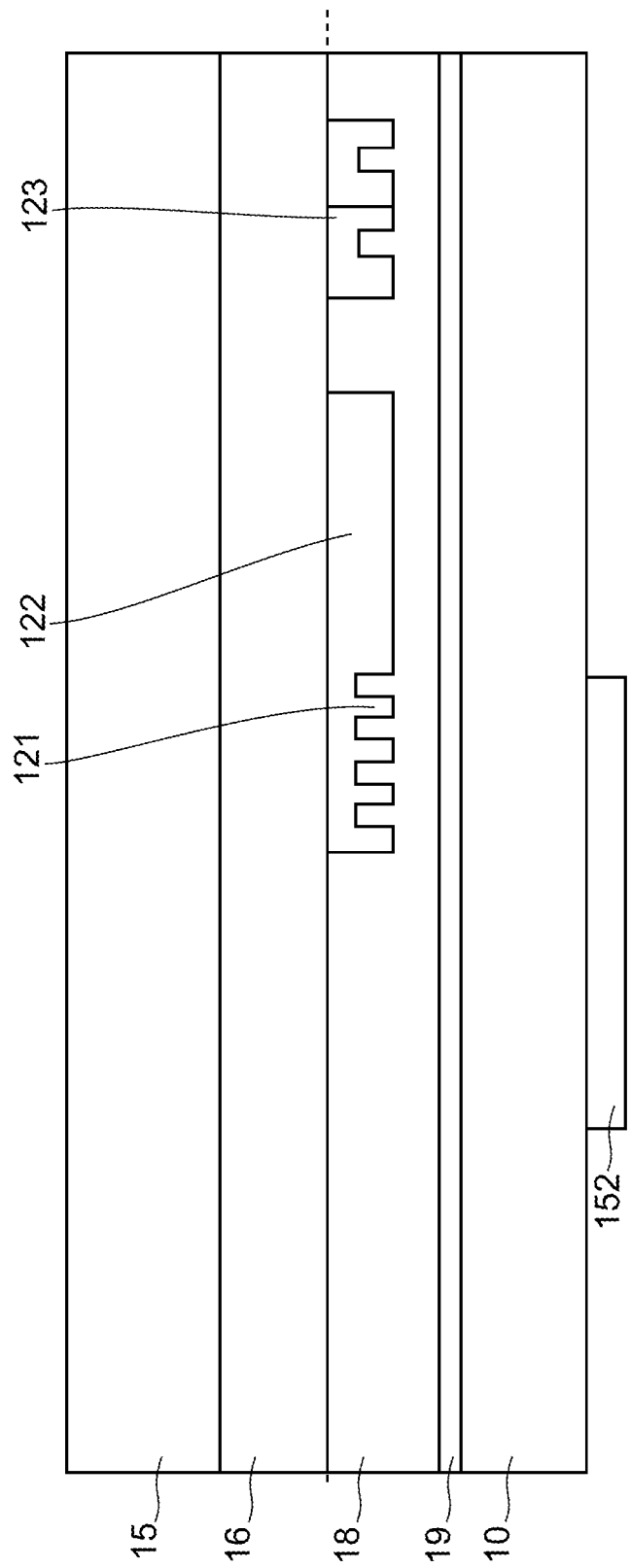
Figure 16:
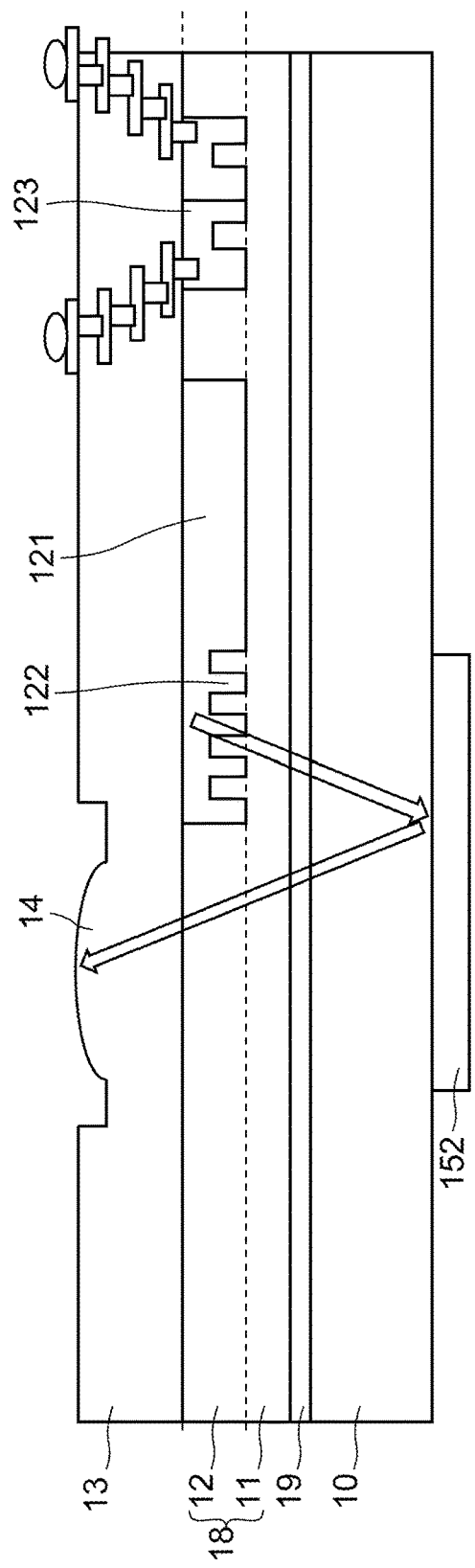

The next step (FIG. 14) is the formation of an encapsulation layer 18 made of a dielectric material and the optional deposit of an anti-reflection layer 19 that may or may not be localised. The next step (FIG. 15) is to turn the structure over on a substrate 10 with a reflecting structure 152 on the back face. The next step is to remove the first substrate 15 and to fabricate the BEOL encapsulation layer 13 and the lens 14 (FIG. 16).

In one variant embodiment, the electrical interconnection lines can be formed in the layer 18 before turning over on the second substrate 10. In this case, the second substrate 10 also comprises electrical interconnections that, when connected to the connections in layer 18, connect the modulator to an electronic chip added onto the back face of the photonic chip.

Figure 19:
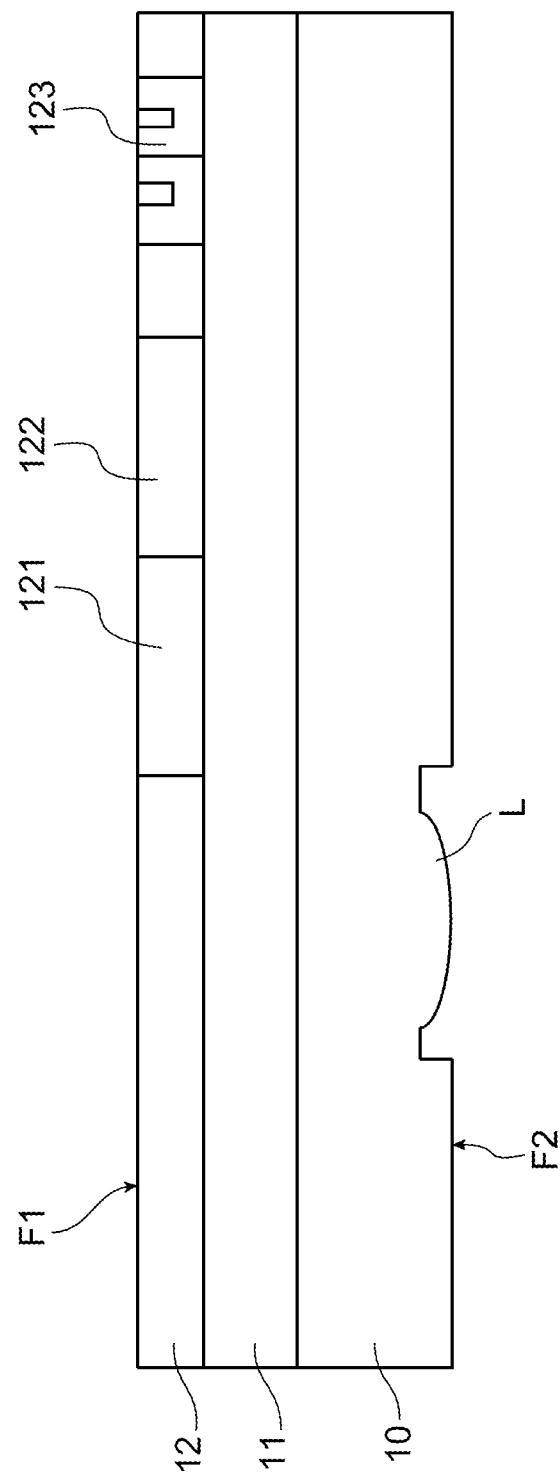
Figure 20:
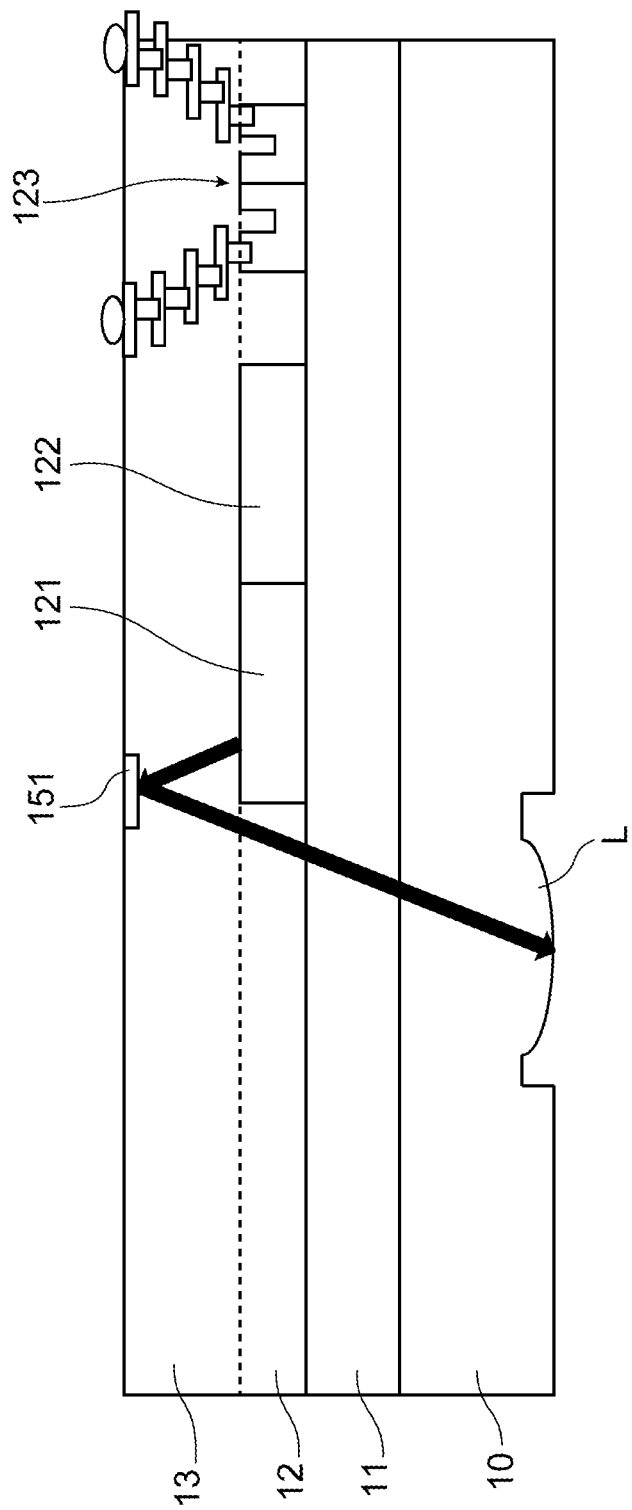

The following describes another example embodiment of a photonic chip according to the invention and more particularly a chip with a lens integrated on the back face. The method begins (FIG. 17) with the supply of an SOI substrate with a buried oxide layer 11 intercalated between a surface silicon layer 121 and a silicon substrate 10. The lens L is fabricated on the back face F2 of the substrate 10 (FIG. 18), followed by fabrication of photonic components (waveguide 121, surface grating coupler 122, PN modulator 123, etc.) by partial or total local etching of the surface layer 12, and implantation in the case of the modulator (FIG. 19). Then, with reference to FIG. 20, the BEOL encapsulation layer 13 is fabricated integrating the electrical interconnection lines, followed by fabrication of a mirror 151 on the front face F1. As shown, the result obtained is an optical path with folding, but with a single pass with the substrate. The mirror 151 is accompanied by mirrors 152 and 153, to achieve the configuration shown in FIG. 6.

It will be observed that these methods can be used to collectively fabricate a plurality of lenses on the photonic chip, these lenses for example being designed to participate in coupling of the optical chip to a set of optical fibres or a set of photonic chips. A single alignment operation is then necessary (lithographic alignment at the wafer). It is then possible to fabricate several chips and their lenses at the same time on the same wafer, such that a single alignment is necessary for a plurality of chips, instead of performing a plurality of alignments.

The invention is not limited to a photonic chip, it also includes its fabrication method, and particularly a method of fabricating several chips collectively on the same wafer. This method includes the formation of an arrangement of one or several reflecting structures each on either the front face or the back face, said arrangement being formed in such a way that light is propagated in the photonic chip from the surface grating coupler and the lens along a path passing through the substrate and having at least one fold. The method includes the formation of a lens at either the front face or the back face of the photonic chip, configured to modify the mode size of light passing through it from or to the surface grating coupler.

The invention also includes a system comprising the photonic chip according to the invention and the external device provided with a lens performing the function inverse to that performed by the lens integrated into the chip, the chip and the external device being optically coupled by means of a system for widening the mode size composed of the two lenses.

The invention claimed is:

1. A photonic chip comprising:
    a light guide layer supported by a substrate and covered with an encapsulation layer,
    a front face on the side of the encapsulation layer, and
    a back face on the side of the substrate,
wherein the light guide layer includes a waveguide and a surface grating coupler, the surface grating coupler being configured to receive light from the waveguide and to form a light beam directed towards either the front face or the back face,
    wherein the photonic chip further comprises a lens which is integrated at either the front face or the back face and which is configured to modify the mode size of light passing through it from or to the surface grating coupler, and
    wherein the photonic chip further comprises an arrangement of one or several reflecting structures, each on either the front face or the back face, said arrangement comprising a reflecting structure on the back face and being made so as to propagate light between the surface grating coupler and the lens along an optical path having at least one fold.

2. The photonic chip according to claim 1, in which a reflecting structure of said arrangement is a metallic layer arranged on either the front face or the back face.

3. The photonic chip according to claim 1, in which a reflecting structure of said arrangement is a distributed Bragg grating formed on either the front face or the back face.

4. The photonic chip according to claim 1, in which the lens is integrated on the front face, the surface grating coupler is configured to redirect the light beam towards the back face and said arrangement comprises along the optical path a single reflecting structure on the back face.

5. The photonic chip according to claim 1, in which the lens is integrated on the front face, the surface grating coupler is configured to redirect the light beam towards the front face and said arrangement comprises along the optical path a first reflecting structure on the front face and a second reflecting structure on the back face.

6. The photonic chip according to claim 1, in which the lens is integrated on the back face, the surface grating coupler is configured to redirect the light beam towards the back face and said arrangement comprises along the optical path a first reflecting structure on the back face and a second reflecting structure on the front face.

7. The photonic chip according to claim 1, in which the lens is integrated on the back face, the surface grating coupler is configured to redirect the light beam towards the front face and said arrangement comprises along the optical path a first reflecting structure on the front face, a second reflecting structure on the back face and a third reflecting structure on the front face.

8. The photonic chip according to claim 1, in which the encapsulation layer is a silicon oxide layer, a silicon nitride layer or a layer composed of a mix of silicon oxide and silicon nitride.

9. The photonic chip according to claim 1, in which the light guide layer is supported on an insulation layer and in which an anti-reflection layer is interposed between the substrate and the insulation layer.

10. The photonic chip according to claim 1, in which the substrate is made of glass.

11. A method of fabricating a photonic chip comprising a surface grating coupler and having a front face and a back face, the method including the step of forming a lens on either the front face or the back face, said lens being configured to modify the mode size of light passing through it from or to the surface grating coupler, and the step of forming an arrangement of one or several reflecting structures each on either the front face or the back face, said arrangement comprising a reflecting structure on the back face and being formed to propagate light between the surface grating coupler and the lens along an optical path having at least one fold.

\* \* \* \* \*